United States Patent [19]

Kanda et al.

[11] Patent Number: 4,582,813

[45] Date of Patent: Apr. 15, 1986

[54] SINTERED ALUMINA PRODUCT

[75] Inventors: Atsushi Kanda; Tatsuo Kato; Shunichi Takagi, all of Aichi, Japan

[73] Assignee: NGK Spark Plug Co., Ltd., Japan

[21] Appl. No.: 580,046

[22] Filed: Feb. 14, 1984

[30] Foreign Application Priority Data

Feb. 14, 1983 [JP] Japan .................................. 58-23414

[51] Int. Cl.[4] .......................................... C04B 35/44
[52] U.S. Cl. ..................... 501/128; 501/153
[58] Field of Search ............................... 501/128, 153

[56] References Cited

U.S. PATENT DOCUMENTS

| | | | |
|---|---|---|---|
| 3,615,763 | 10/1971 | Flock .................................. | 501/128 |
| 3,627,547 | 12/1971 | Bailey .................................. | 501/153 |
| 3,929,496 | 12/1975 | Asuno et al. ...................... | 501/153 |
| 3,935,017 | 1/1976 | Gardner ............................. | 501/153 |
| 4,045,234 | 8/1977 | Ring .................................... | 501/153 |

Primary Examiner—John F. Niebling
Assistant Examiner—Terryence Chapman
Attorney, Agent, or Firm—Sughrue, Mion, Zinn, Macpeak and Seas

[57] ABSTRACT

Sintered alumina product comprising 90 to 98 wt % of alumina as the main component, and which further contains as auxiliary components not more than 1 wt % of BaO and 1 to 10 wt % of a composite oxide having the composition included within the hexagon ABC-DEF (except for the line AF) in an $SiO_2$-$CaO$-$MgO$ phase diagram, the respective apexes having the following definitions:

| | $SiO_2$ | CaO | MgO |
|---|---|---|---|
| A | 60 | 40 | 0 |
| B | 60 | 25 | 15 |
| C | 45 | 25 | 30 |
| D | 40 | 30 | 30 |
| E | 40 | 55 | 5 |
| F | 45 | 55 | 0. |

6 Claims, 6 Drawing Figures

SINTERED ALUMINA PRODUCT

BACKGROUND OF THE INVENTION

The present invention relates to alumina sintered product having high dielectric breakdown strength at elevated temperatures.

Densely sintered alumina products are extensively used as electrical insulating materials at high temperatures because they have not only high mechanical strength and insulation resistance at elevated temperatures as well as high heat resistance and dielectric breakdown strength. However, the only knowledge about their dielectric breakdown strength at elevated temperatures is that it is increased as more alumina is contained.

SUMMARY OF THE INVENTION

The present invention has been accomplished on the basis of the finding that the dielectric breakdown strength of sintered alumina products is closely related to the composition of auxiliary components. The invention provides a sintered alumina product having improved dielectric breakdown strength at elevated temperatures.

The present invention essentially relates to a sintered alumina product comprising 90 to 98 wt% of alumina as the main component and which further contains as auxiliary components not more than 1 wt% of BaO and 1 to 10 wt% of a composite oxide having the composition included within the hexagon ABCDEF (except for the line AF) in the $SiO_2$-CaO-MgO phase diagram of FIG. 1.

The present invention also relates to a sintered alumina product comprising 90 to 98 wt% of alumina as the main component, and which further contains as auxiliary components not more than 1 wt% of BaO, 0.1 to 0.9 wt% of $B_2O_3$, and 0.1 to 9.9 wt% of a composite oxide having the composition included within the hexagon ABCDEF (except for the line AF) in the $SiO_2$-CaO-MgO phase diagram of FIG. 1.

The materials for the respective components of the sintered product according to the present invention are not limited to those used in the working examples given below, and not only oxides but also hydroxides, chlorides, carbonates, nitrates and other salts, as well as metal powders and any other materials that are converted to the oxides after sintering may be employed.

DESCRIPTION OF THE PREFERRED EMBODIMENTS

The present invention is hereunder described in detail by reference to working examples which are given here for illustrative purposes only.

EXAMPLES

Figure 2:
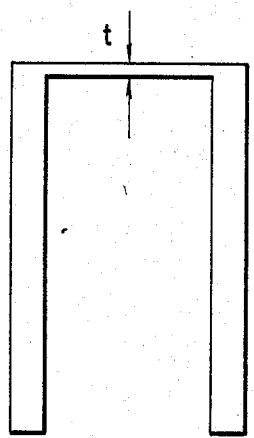
FIG. 2 is a front view showing schematically a sample of sintered alumina product used in the measurement of dielectric breakdown voltage.
Figure 3:
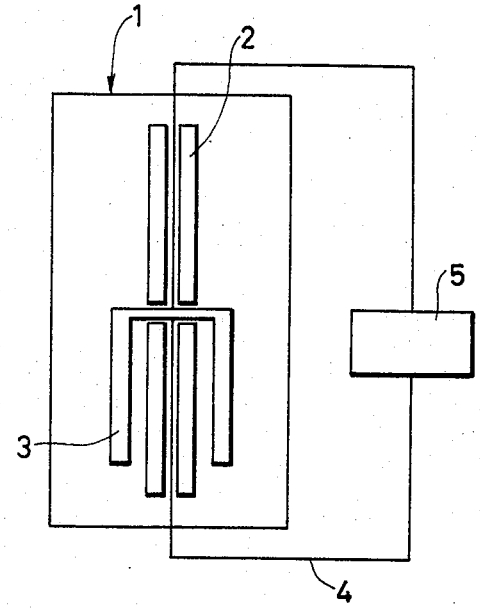
FIG. 3 shows schematically an apparatus for measuring the dielectric breakdown voltage of sintered alumina product.

Two groups of commercial alpha-$Al_2O_3$ powder (average particle size: 1.7 μm), one being used in an amount of 90% and the other in 94% (all percents being by weight), were blended with $SiO_2$, $CaCO_3$ and $MgCO_3$ in the amounts indicated in Tables 1 and 2 so that the total weight of these auxiliary components in the final sintered compositions was 10% or 6%. The respective blend samples were wet ground to give an average particle size of 1.5 μm, dried, compacted at 1 ton/cm² to give a shape having t=1 mm (see FIG. 2), and sintered at the temperatures listed in Tables 1 and 2. The dielectric breakdown voltage (Vi) of each sintered sample was measured with an apparatus shown schematically in FIG. 3 which consisted of an electric furnace 1, two porcelain tube insulators 2 arranged one on top of the other, electrodes 4 passing through the insulators, and a power supply 5. Each of the samples 3 was placed between the insulators and varying voltages of standard surge impulse wave (1×40 μs) having a duration of wave front of 1 μs were applied to the sample until its breakdown occurred. The breakdown voltages (Vi) for the respective samples at 500° C. are shown in Tables 1 and 2.

TABLE 1

| Auxiliary[1] Component No. | Composition (%) $Al_2O_3$ | $SiO_2$ | CaO | MgO | Sintering Temperature (°C.) | Dielectric[2] Breakdown Voltage | Remarks |
| --- | --- | --- | --- | --- | --- | --- | --- |
| 1 | 90 | 8 | 1 | 1 | 1620 | X | Outside the |
| 2 | 90 | 6 | 1 | 3 | 1580 | X | scope of the |
| 3 | 90 | 6.3 | 1 | 2.7 | 1550 | X | present invention. |
| 4 | 90 | 6 | 3.5 | 0.5 | 1550 | O | Within the |
| 5 | 90 | 6 | 2.5 | 1.5 | 1550 | Δ | scope of the |
| 6 | 90 | 5.2 | 4.3 | 0.5 | 1530 | O | present |
| 7 | 90 | 5.2 | 3.3 | 1.5 | 1550 | O | invention. |
| 8 | 90 | 4.5 | 2.5 | 3.0 | 1570 | Δ | |
| 9 | 90 | 4 | 5.5 | 0.5 | 1570 | Δ | |
| 10 | 90 | 4 | 4.5 | 1.5 | 1570 | Δ | |
| 11 | 90 | 4 | 3 | 3 | 1570 | Δ | |
| 12 | 90 | 3 | 6.5 | 0.5 | 1600 | Δ | Outside the |
| 13 | 90 | 3 | 5.5 | 1.5 | 1610 | X | scope of the |
| 14 | 90 | 3 | 4 | 3 | 1610 | X | present invention. |

Figure 1:
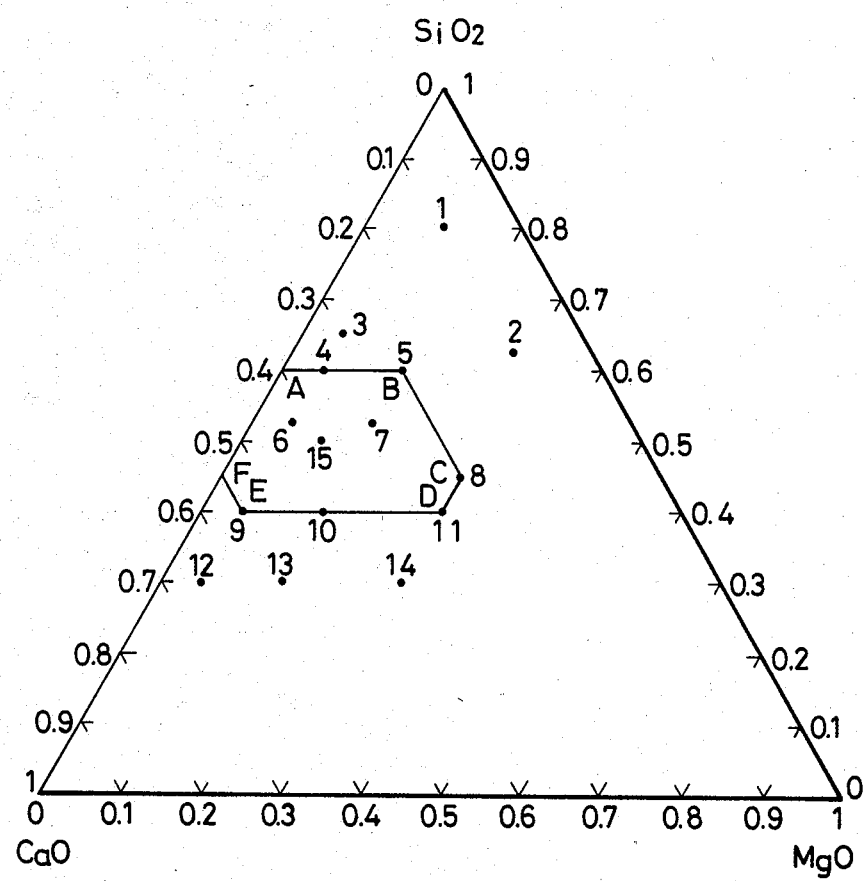
FIG. 1 is an $SiO_2$-CaO-MgO phase diagram.

[1]This number shows that a specific sample contains the auxiliary components in the amounts indicated by a point in the three-component diagram of FIG. 1 keyed to that number.

[2]Symbols O, Δ and X in the column "dielectric breakdown voltage" show that Vi of a specific sample was 40 kV or more, between 30 kV and 40 kV, and less than 30 kV, respectively.

TABLE 2

| Auxiliary*[1] Component No. | Composition (%) Al₂O₃ | SiO₂ | CaO | MgO | Sintering Temperature (°C.) | Dielectric*[2] Breakdown Voltage | Remarks |
| --- | --- | --- | --- | --- | --- | --- | --- |
| 1 | 94 | 4.8 | 0.6 | 0.8 | 1660 | X | Outside the |
| 2 | 94 | 3.6 | 0.6 | 1.8 | 1620 | X | scope of the |
| 3 | 94 | 3.8 | 0.6 | 1.6 | 1580 | X | present invention. |
| 4 | 94 | 3.6 | 2.1 | 0.3 | 1580 | Δ | Within the |
| 5 | 94 | 3.6 | 1.5 | 0.9 | 1580 | Δ | scope of the |
| 6 | 94 | 3.1 | 2.6 | 0.3 | 1560 | O | present |
| 7 | 94 | 3.1 | 2 | 0.9 | 1580 | Δ | invention. |
| 8 | 94 | 2.7 | 1.5 | 1.8 | 1610 | Δ | |
| 9 | 94 | 2.4 | 3.3 | 0.3 | 1610 | O | |
| 10 | 94 | 2.4 | 2.7 | 0.9 | 1610 | O | |
| 11 | 94 | 2.4 | 1.8 | 1.8 | 1610 | Δ | |
| 12 | 94 | 1.8 | 3.9 | 0.3 | 1640 | Δ | Outside the |
| 13 | 94 | 1.8 | 3.3 | 0.9 | 1650 | X | scope of the |
| 14 | 94 | 1.8 | 2.4 | 1.8 | 1650 | X | present invention. |

*[1]This number shows that a specific sample contains the auxiliary components in the amounts indicated by a point in the three-component diagram of FIG. 1 keyed to that number.
*[2]Symbols O, Δ and X in the column "dielectric breakdown voltage" show that Vi of a specific sample was 40 kV or more, between 30 kV and 40 kV, and less than 30 kV, respectively.

As one can see from Tables 1 and 2, the samples having the compositions of the auxiliary components within the range defined by the present invention had higher values of dielectric breakdown strength than those samples having the compositions outside the scope of the invention. Therefore, in the present invention, the proportions of $SiO_2$, CaO and MgO must be included within the hexagon ABCDEF defined in the claims.

Figure 4:
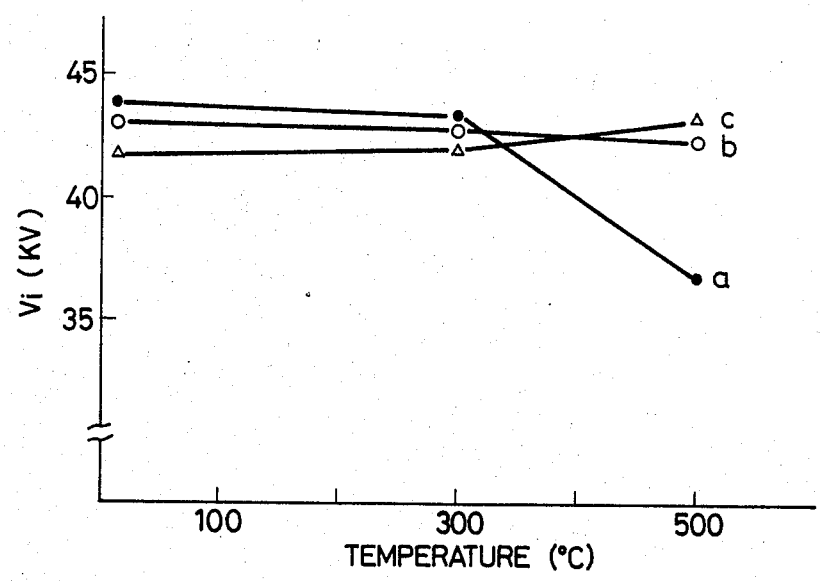
FIGS. 4, 5 and 6 are graphs showing the profile of dielectric breakdown voltage versus temperature, BaO content and $B_2O_3$ content, respectively.

Three samples of $Al_2O_3$ powder whose amounts were 88%, 90% and 98% respectively were blended with the auxiliary components in the amounts indicated at point 15 in FIG. 1, and were subsequently treated in the same manner as described above. The dielectric breakdown voltage (Vi) of each test sample as measured at three different temperatures is shown in FIG. 4, wherein curves a, b and c indicate respectively the samples containing 88%, 90% and 98% of $Al_2O_3$. As can be seen from FIG. 4, the dielectric breakdown strength of the samples containing 90% and 98% of $Al_2O_3$ was not reduced at higher temperatures, but this was not the case with the sample containing 88% of $Al_2O_3$. This demonstrates that satisfactory dielectric breakdown strength at elevated temperatures is not obtained if the content of $Al_2O_3$ is less than 90%. On the other hand, as is well known, difficulties are involved in sintering if the alumina content exceeds 98%. Therefore, according to the present invention, the alumina content must be within the range of 90 to 98%.

Figure 5:
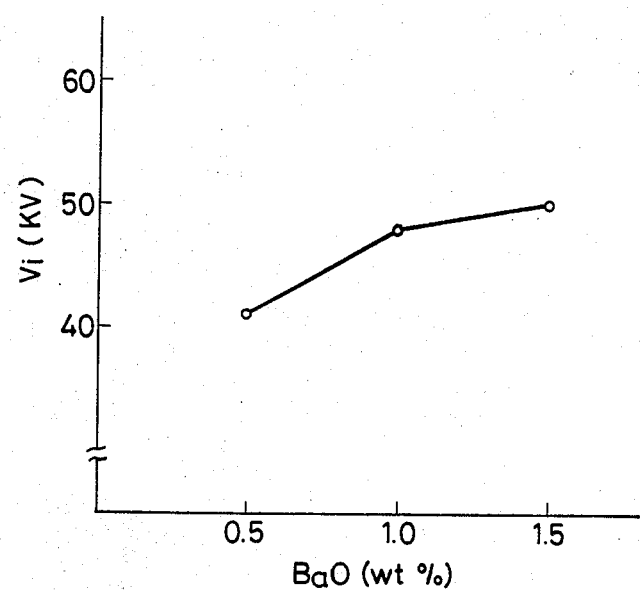

Three other test samples were prepared from 90% of $Al_2O_3$ powder in the same manner as described above except that an additional auxiliary component BaO was incorporated in amounts of 0.5, 1.0 and 1.5% and the other auxiliary components were added in the amounts indicated at point 15 in FIG. 1. The dielectric breakdown voltage (Vi) of each sample as measured at 500° C. is shown in FIG. 5, from which one can see that the dielectric breakdown voltage at high temperatures is increased with the increasing content of BaO. However, difficulties are involved in sintering if the BaO content exceeds 1.0%. Therefore, in the present invention, the BaO content is limited to not more than 1.0%.

Figure 6:
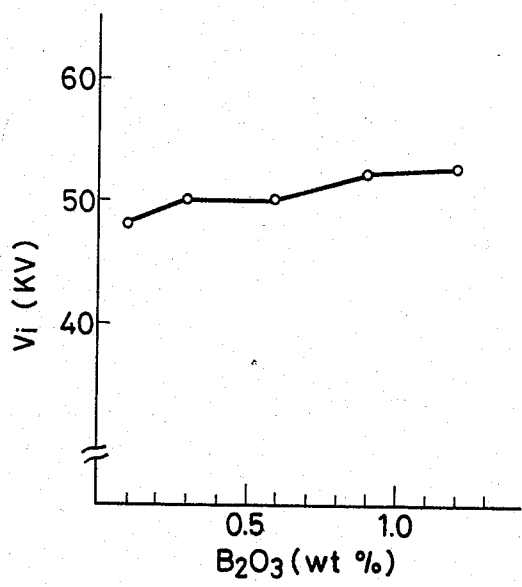

Five more samples were prepared from 94% of $Al_2O_3$ powder and 0.8% of BaO in the same manner as described above except that $B_2O_3$ was used in amounts of 0.1, 0.3, 0.6, 0.9 and 1.2% and the other auxiliary components were used in the amounts indicated at point 15 in FIG. 1. The dielectric breakdown voltage (Vi) of each sample as measured at 500° C. is shown in FIG. 6, from which one can see that the dielectric breakdown voltage at high temperatures is slightly increased by the addition of $B_2O_3$. However, if the $B_2O_3$ content exceeds 0.9%, abnormal growth of $Al_2O_3$ grains occur, and if the $B_2O_3$ content is less than 0.1%, the desired improvement in the dielectric breakdown voltage is not obtained. Therefore, in the present invention, the $B_2O_3$ content is limited to the range of 0.1 to 0.9%.

As described in the foregoing, the sintered alumina product of the present invention has improved dielectric breakdown strength at high temperatures and can be manufactured by known ceramics technology. Therefore, this product finds extensive utility in industrial applications and can be used as tube insulators, terminals for electronic parts and other insulating materials that have to be used at elevated temperatures.

What is claimed is:

1. Sintered alumina product comprising 90 to 98 wt% of alumina as a main component, and which further contains as auxiliary components BaO in an amount of effective to increase dielectric breakdown voltage at high temperature but not more than 1 wt% of BaO, and 1 to 10 wt% of a composite oxide having a composition included within a hexagon ABCDEF (except for the line AF) in an $SiO_2$-CaO-MgO phase diagram, the respective apexes of the hexagon having the following definitions:

| | SiO₂ | CaO | MgO |
| --- | --- | --- | --- |
| A | 60 | 40 | 0 |
| B | 60 | 25 | 15 |
| C | 45 | 25 | 30 |
| D | 40 | 30 | 30 |
| E | 40 | 55 | 5 |
| F | 45 | 55 | 0. |

2. Product according to claim 1, wherein the amount of BaO is at least 0.5 wt% BaO.

3. Product according to claim 1, wherein the amount of BaO is at least 0.8 wt% BaO.

4. Sintered alumina product comprising 90 to 98 wt% of alumina as a main component, and which further contains as auxiliary components BaO in an amount effective to increase dielectric breakdown voltage at high temperatures but not more than 1 wt% of BaO, 0.1 to 0.9 wt% of $B_2O_3$, and 0.1 to 9.9 wt% of a composite oxide having a composition included within a hexagon ABCDEF (except for the line AF) in an SiO$_2$-CaO-MgO phase diagram, the respective apexes of the hexagon having the following definitions:

|   | SiO$_2$ | CaO | MgO |
|---|---|---|---|
| A | 60 | 40 | 0 |
| B | 60 | 25 | 15 |
| C | 45 | 25 | 30 |
| D | 40 | 30 | 30 |
| E | 40 | 55 | 5 |
| F | 45 | 55 | 0. |

5. Product according to claim 4, wherein the amount of BaO is at least 0.5 wt% BaO.

6. Product according to claim 2, wherein the amount of BaO is at least 0.8 wt% BaO.

* * * * *